2,664,855

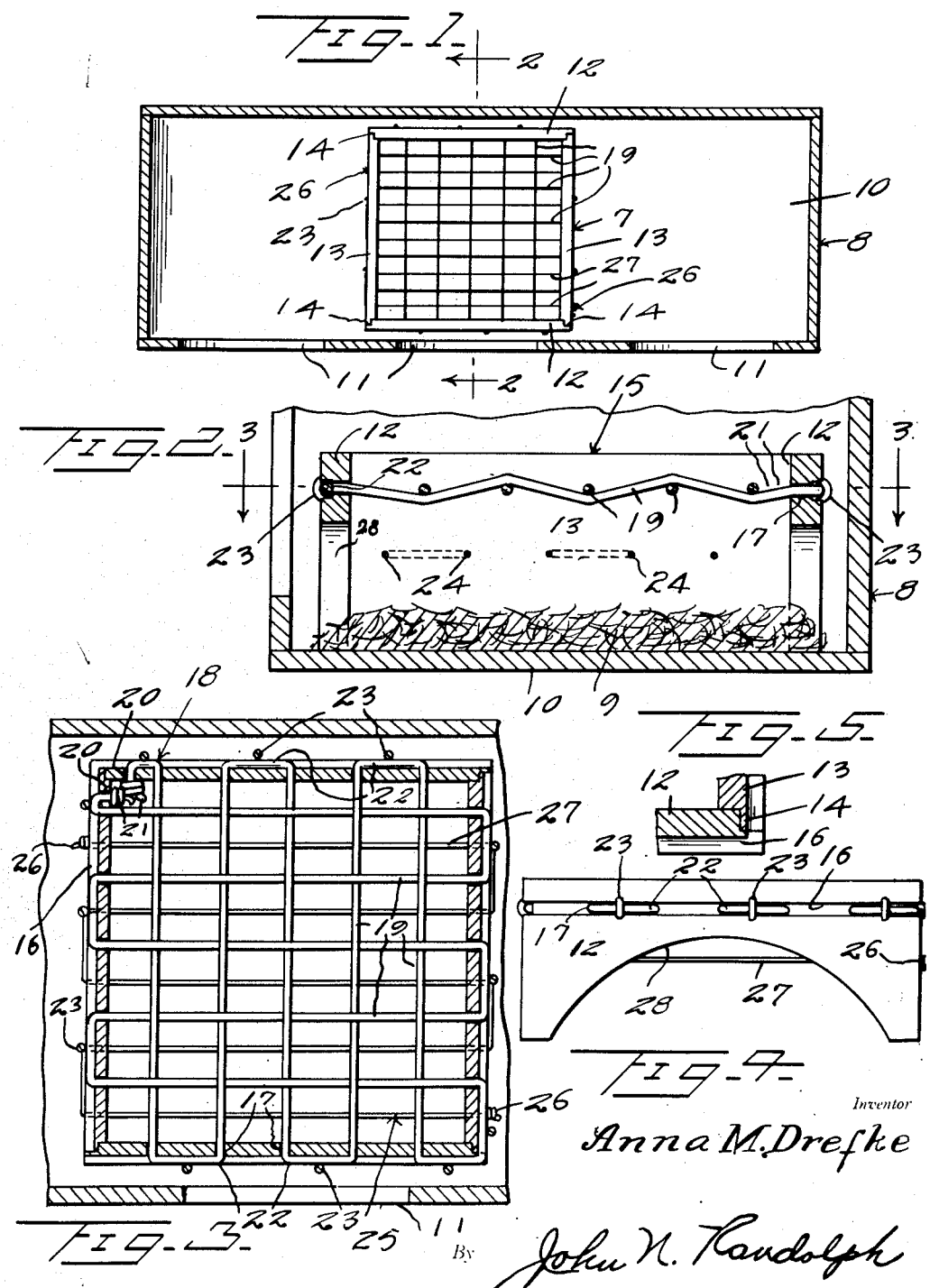
Jan. 5, 1954     A. M. DREFKE     2,664,855
SANITARY NEST DEPOSITORY
Filed June 21, 1950
Inventor
Anna M. Drefke
By John N. Randolph
Attorney Patented Jan. 5, 1954

UNITED STATES PATENT OFFICE 2,664,855

SANITARY NEST DEPOSITORY

Anna M. Drefke, Hackensack, Minn.

Application June 21, 1950, Serial No. 169,463

5 Claims. (Cl. 119—48)

This invention relates to a novel construction of sanitary nest for use by laying hens or other fowl which will effectively function to allow eggs after being laid to be deposited on the nest and out of contact with the hen so that the eggs may cool thus minimizing spoilage and enabling the eggs to be maintained in a clean condition so that the eggs may be sold as clean un-washed eggs.

Another object of the invention is to provide a nest and egg depository which will effectively eliminate breakage of eggs and will also cause the eggs to be positioned so that they may not be picked and broken by the hen, stepped upon or soiled or otherwise damaged.

Still a further object of the invention is to provide a nest having a hen support disposed thereabove whereby the hens are prevented from scratching the nest or soiling the nest litters.

Still a further object of the invention is to provide an improved construction of nest for use in conventional wood or metal laying boxes having means for supporting a hen above the nest litter and means for receiving laid eggs and for directing the eggs laterally onto the litter and into positions so that subsequently laid eggs may not drop directly onto a previously laid egg, thus enabling the improved hen's nest to be employed by a greater number of hens than would otherwise be possible.

Still a further object of the invention is to provide a nest of extremely simple construction which is capable of being very economically manufactured and sold, which can be readily maintained in a clean and sanitary condition and which is very effective for accomplishing its intended result.

Various other objects and advantages of the invention will hereinafter become more fully apparent from the following description of the drawing, illustrating a presently preferred embodiment thereof, and wherein:

Figure 1 is a horizontal sectional view taken through a laying box above the nest frame showing the novel sanitary laying nest in top plan therein;

Figure 2 is an enlarged transverse sectional view taken substantially along a plane as indicated by the line 2—2 of Figure 1;

Figure 3 is a horizontal sectional view of the nest taken substantially along a plane as indicated by the line 3—3 of Figure 2;

Figure 4 is a front or rear elevational view of the nest, and

Figure 5 is an enlarged fragmentary sectional view taken along the same plane as Figure 3 and showing the lower right hand corner of the nest frame as it appears with the cords removed.

Referring more specifically to the drawing, the novel sanitary nest depository in its entirety and comprising the invention is designated generally 7 and is illustrated applied to a conventional laying box 8 over a suitable litter 9 which is supported on the floor or bottom 10 of the box 8. The front wall of the box 8 is provided with the usual entrance and exit openings for hens.

The sanitary nest depository 7 includes a frame, which may be formed of any suitable material such as wood, composed of corresponding front and rear walls 12 and corresponding side walls 13. The ends of the walls 12 and 13 are recessed on their inner sides for interfitting engagement to provide the joints 14 and said walls 12 and 13 are secured together in any suitable manner at the joints 14 to form the frame, designated generally 15. The walls 12 and 13 beneath but adjacent their upper edges are provided in their outer sides with communicating grooves 16 and said walls are provided with longitudinally spaced openings 17 extending therethrough and the outer ends of which open into the grooves 16.

A rope 18 of suitable length and suitable diameter, preferably about one-quarter of an inch, is laced back and forth between the front and rear walls 12 and then back and forth between the side walls 13 and over and under the rope portions extending between the walls 12 to form an open rope mesh 19 having openings of sufficient size to permit an egg to readily drop therethrough and forming two sets of ropes. The frame 15 is provided with openings 20 adjacent to one corner thereof which likewise open into the grooves 16 and through which the ends of the rope are passed inwardly and knotted, as seen at 21 for anchoring the ends of the rope to the frame 15. The portions 22 of the rope 18 which extend along the grooves 16 are anchored thereto by staples 23 to retain a proper tension on the rope portions extending between the walls 12 and between the walls 13.

The walls 13 are provided with aligned openings 24 below the level of the grooves 16 and a rope or cord 25 forming a third set of ropes laced back and forth between the side walls 13 through said openings 24 with portions of the cord 25 extending along the outer sides of the walls 13 and with the ends of the cord 25 knotted as seen at 26 at the outer sides of the walls 13 for anchoring one end of the cord to each wall 13.

The openings 24 are arranged so that the cord portions 27 which extend between the walls 13 will be positioned beneath and centrally of the openings of the rope mesh 19 so that said cord portions 27 form guide cords, as will hereinafter become apparent. The guide cords 27 are positioned sufficiently below the rope mesh 19 so that an egg, not shown, may fall through an opening in the mesh 19 before striking a cord portion 27. The front and rear walls 12 are provided with corresponding relatively large arcuate recesses or notches 28 which extend from the bottom thereof to a point beneath and adjacent the grooves 16 to afford access to the interior of the frame 15.

From the foregoing it will be readily apparent that the nest 7 may be positioned so that the bottom edge of its frame 15 will rest upon the bottom 10 of the laying box 8 and be supported thereby within the laying box adjacent to an entrance and exit opening 11 thereof and with the nest disposed over a litter of straw or other suitable material which rests upon the laying box bottom 10 and the top of which is disposed substantially beneath the guide cords 27. With the nest 7 thus disposed in the laying box 8, the rope mesh 19 will afford a comfortable support for the hen to sit upon while laying and an egg after being laid will drop through any one of the openings provided by the rope mesh 19, which openings are of ample size to allow an egg to pass therethrough. The egg, not shown, after dropping through an opening of the rope mesh 19 will not fall directly upon the litter 9 but rather will initially strike one of the guide cords 27 which will break the fall of the egg to a certain extent and also deflect the egg toward either the front or rear wall 12 and into a position beneath one of the rope portions which extend between the side walls 13, so that eggs subsequently laid may not drop directly on a previously laid egg with the possibility of one or both eggs being broken. The openings or notches 28 in the front and rear walls 12 afford ready access to the bottom portion of the nest 7 so that eggs may be removed therefrom without disturbing a laying hen.

It will thus be apparent that a novel construction of sanitary laying nest depository has been provided by the use of which eggs immediately after being laid will be directed by gravity away from the hen to eliminate spoiling by allowing the egg to cool promptly and be kept in a clean, unbroken condition. It will also be apparent that the nest 7 will prevent a hen from breaking the the eggs, from scratching apart the nest or soiling the nest litter. Likewise, the nest 7 can be used a number of times before removal of the eggs so that fewer laying boxes and fewer nests are therefore required.

Various modifications and changes are contemplated and may obviously be resorted to, without departing from the spirit or scope of the invention as hereinafter defined by the appended claims.

I claim as my invention:

1. A sanitary laying nest comprising a frame having substantially parallel side walls and substantially parallel front and rear walls, two sets of ropes, a first set of ropes extending between the side walls and a second set of ropes extending between the front and rear walls and forming an open mesh hen supporting surface beneath and adjacent the open top of the frame, said ropes of each set being spaced apart a distance, slightly greater than the diameter of a hen's egg, a third set of ropes extending between and secured to said side walls substantially below the level of said rope mesh, said ropes of the third set being offset midway between the ropes of said first set of ropes whereby an egg dropping through any of the openings of the rope mesh will strike a rope of the third set and thus cushion its fall.

2. A sanitary laying nest as in claim 1, said ropes of the first two sets of ropes being interwoven.

3. A sanitary laying nest as in claim 1, said ropes of the first two sets of ropes being formed from a single strand of rope-like material, said side walls, front wall and rear wall having spaced openings through which the strand is laced, and the ends of the strand being anchored to two of said walls adjacent one corner of the frame.

4. A sanitary laying nest as in claim 3, said walls having grooves extending along outer sides thereof communicating with said openings and in which portions of the strand are disposed.

5. A sanitary laying nest as in claim 1, said frame being adapted to be disposed in a laying box with the open bottom thereof resting on the laying box bottom, and the front wall of said frame having an arched shaped notch opening outwardly of its bottom edge and extending upwardly to above the level of the third set of ropes, said notch being adapted to align with a front wall opening of the laying box to provide access to the interior of the frame below the ropes of said third set for removing eggs therefrom without disturbing the laying nest.

ANNA M. DREFKE.

References Cited in the file of this patent

UNITED STATES PATENTS

| Number | Name | Date |
|---|---|---|
| 857,213 | Stevens | June 18, 1907 |
| 1,329,024 | Scott | Jan. 27, 1920 |
| 1,827,944 | Krogstad | Oct. 20, 1931 |

FOREIGN PATENTS

| Number | Country | Date |
|---|---|---|
| 101,987 | Australia | Sept. 6, 1937 |